United States Patent [19]

Takemoto et al.

[11] 4,181,105
[45] Jan. 1, 1980

[54] IGNITION TIMING CONTROL FOR INTERNAL COMBUSTION ENGINE HAVING A DUAL INDUCTION TYPE INTAKE SYSTEM

[75] Inventors: Yasunori Takemoto; Koji Asanomi; Kazuo Kobayashi, all of Hiroshima, Japan

[73] Assignee: Toyo Kogyo Co., Ltd., Hiroshima, Japan

[21] Appl. No.: 859,758

[22] Filed: Dec. 12, 1977

[30] Foreign Application Priority Data

Dec. 13, 1976 [JP] Japan .................................. 51-150095

[51] Int. Cl.² .......................... F02P 5/04; F02M 13/06
[52] U.S. Cl. .............................. 123/117 A; 123/75 B; 123/127; 123/117 R; 123/30 C
[58] Field of Search ................. 123/127, 30 C, 117 A, 123/117 R, 75 B

[56] References Cited

U.S. PATENT DOCUMENTS

| | | | |
|---|---|---|---|
| 2,711,162 | 6/1955 | Roberts | 123/117 A |
| 3,171,395 | 3/1965 | Bartholomew | 123/127 |
| 3,678,905 | 7/1972 | Diehl | 123/75 B |
| 3,727,596 | 4/1973 | Panhard | 123/117 A |
| 3,810,452 | 5/1974 | Morris | 123/117 A |
| 3,930,474 | 1/1976 | Kawai | 123/117 A |

*Primary Examiner*—Ronald B. Cox
*Attorney, Agent, or Firm*—Fleit & Jacobson

[57] ABSTRACT

Internal combustion engine having an intake port formed in cylinder head and a first and second intake passages both connected with said intake port. The intake passages are respectively provided with throttle valves and the throttle valve in the second intake passage is opened only under a heavy load operation. The ignition timing is advanced when the throttle valve in the second intake passage has been brought into operation.

4 Claims, 3 Drawing Figures

IGNITION TIMING CONTROL FOR INTERNAL COMBUSTION ENGINE HAVING A DUAL INDUCTION TYPE INTAKE SYSTEM

The present invention relates to internal combustion engines and more particularly to intake systems for such engines. More specifically, the present invention pertains to internal combustion engines having dual induction type intake systems.

Hithertofore, it has already been proposed to provide an internal combustion engine with an intake system comprising a single intake port and two separated intake passages communicating with the intake port. The first one of the intake passages has a comparatively small cross-sectional area while the second one has a comparatively large cross-sectional area. The both of the passages have throttle valves respectively and the throttle valve in the second passage is opened only during a heavy load operation of the engine. Such intake system may be referred as "dual induction" type and examples of such system may be found in the U.S. Pat. Nos. 3,408,992; 3,418,981 and 3,678,905.

This type of intake system has been found advantageous in that atomization and vaporization of fuel can be enhanced under a light and medium load operations because air or air-fuel mixture is passed only through the relatively narrow intake passage at a high speed. Further, under a heavy load operation, additional charge is supplied on demand through the relatively large second passage so as to provide a desired engine output. It has also been recognized in this type of intake system that an improved combustion of mixture can be achieved in the combustion chamber where the intake port is so designed that the kinetic energy of the intake flow can be effectively utilized to produce an intense swirl in the combustion chamber as, for example, discussed in copending U.S. patent application Ser. No. 840,365 which has been filed on Oct. 7, 1977 claiming the convention priority based on Japanese patent application Sho 51-121531 filed on Oct. 9, 1976 and on Japanese Utility Model application Sho 51-175089 filed on Dec. 24, 1976 and has been assigned to the assignee of this application.

In the aforementioned dual induction type intake system, however, it has been experienced that conventional manners of control of ignition timing have not been satisfactory. In this type of intake system, improved atomization and vaporization of fuel can be achieved under a light and medium load operations and it is also possible to produce an intense swirl in the combustion chamber. Thus, the combustion rate of the air-fuel mixture is comparatively increased and consequently the ignition timing has to be comparatively retarded. On the other hand, under the heavy load operation, there is a sudden decrease in the speed of gas flow and also in the intensity of the swirl of the mixture in the combustion chamber as soon as the throttle valve in the second passage is started to open. Therefore, the ignition timing has to be advanced under the heavy load operation with respect to the ignition timing under the light and medium load operations.

The present invention has therefore an object to provide internal combustion engines with ignition timing control means which can provide optimum performance in respect of fuel economy and engine output throughout the operating range.

Another and more specific object of the present invention is to provide internal combustion engines having duel induction type intake systems with means for advancing ignition timing as soon as the throttle valve in the second intake passage is started to open for heavy load operation.

According to the present invention, the above and other objects can be accomplished by an internal combustion engine comprising cylinder means, piston means disposed in said cylinder means for defining therein combustion chamber means of variable volume, intake port means provided in said cylinder means and opening to said combustion chamber means, first and second intake passage means connected with said intake port means, first and second throttle valve means respectively provided in said first and second intake passage means, means for actuating said first and second throttle valve means so that the second throttle valve means is started to open after the first throttle valve means has been substantially fully opened, means for controlling ignition timing, means for sensing that the second throttle valve means has been started to open and controlling said ignition timing control means so that ignition timing is advanced under operation wherein the second throttle valve means is opened. The last mentioned sensing means may be embodied in the form of a suction pressure switch which is adapted to be actuated under the pressure in the second intake passage. Alternatively, the ignition timing control means may be mechanically actuated through a suction pressure actuator under the pressure in the second intake passage.

It should of course be noted that any conventional manner of advancing the ignition timing may additionally be provided together with the ignition timing control in accordance with the present invention. For example, the ignition timing control means may include centrifugal means for advancing the ignition timing in accordance with an increase in the engine speed. Further, the ignition timing control means may include suction pressure control means for controlling the ignition timing in accordance with the suction pressure in the first intake passage.

The above and other objects and features of the present invention will become apparent from the following descriptions of preferred embodiments taking reference to the accompanying drawings, in which.

Figure 1:
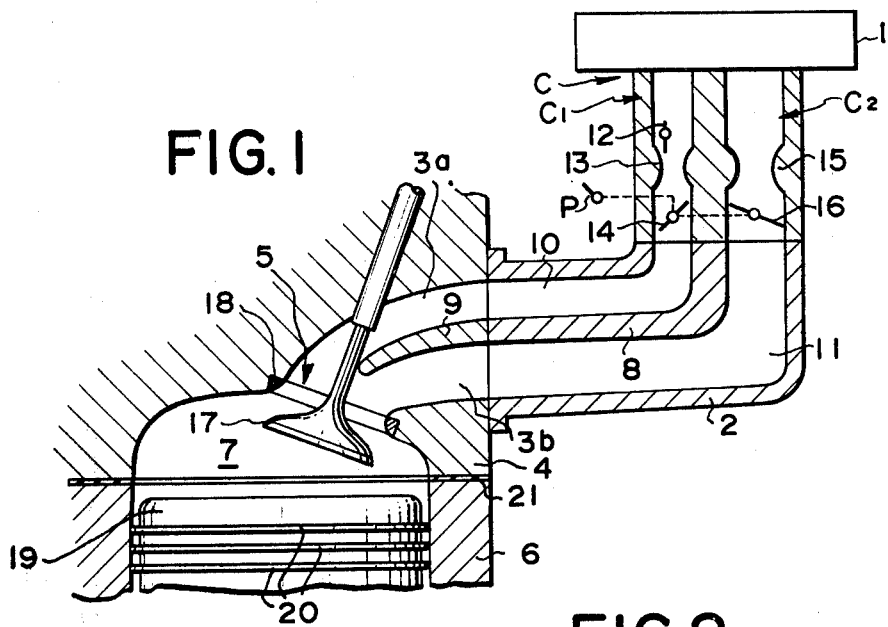
FIG. 1 is a diagrammatical sectional view of an internal combustion engine in which the present invention can be embodied.

Referring now to the drawings, particularly to FIG. 1, the internal combustion engine shown therein includes a cylinder 6 having a cylinder head 4 secured thereto with an intervention of a gasket 21. A piston 19 having piston rings 20 is disposed in the cylinder 6 to define a combustion chamber 7. The cylinder head 4 is formed with an intake port 5 which is in communication with passages 3a and 3b separated by a wall 9 which extends to a position in the vicinity of the intake port 5.

The engine has an intake system including an air cleaner 1 and a carburetor assembly C which includes a first carburetor $C_1$ and a second carburetor $C_2$. The first carburetor $C_1$ includes a choke valve 12, a first venturi 13 and a first throttle valve 14. The second carburetor $C_2$ includes a second venturi 15 and a second throttle valve 16. The carburetor assembly C is connected with an intake manifold 2 which is in turn connected with the cylinder head 4. The intake manifold 2 has a first intake passage 10 and a second intake passage 11 which are separated by a wall 8. The first intake passage 10 is connected at one end with the first carburetor $C_1$ and at the other end with the passage 3a in the cylinder head 4. Similarly, the second intake passage 11 is connected at one end with the second carburetor $C_2$ and at the other end with the passage 3b.

The first intake passage 10 has a cross-sectional area which is small in relation to that of the second intake passage 11. The throttle valves 14 and 16 are associated with a throttle actuating mechanism P which serves to open the second throttle valve 16 when the first throttle valve 14 has reached a wide-open position, preferably a full open position, and the engine speed is above a predetermined value. For the purpose, a pneumatically operated throttle valve actuator may be provided for the second throttle valve 16.

Figure 2:
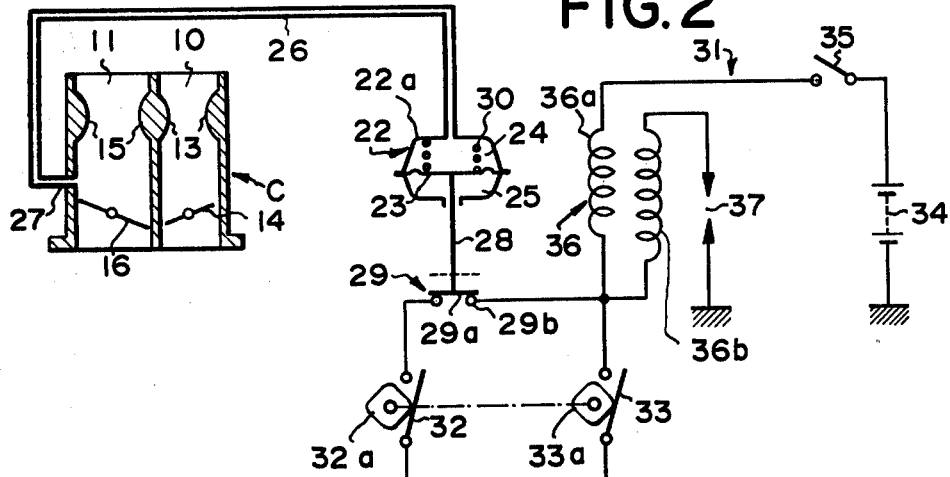
FIG. 2 is a diagrammatical view of the ignition timing control system embodying the feature of the present invention.

The intake port 5 in the cylinder head 4 is provided with a valve seat 18 and an intake valve 17 is provided for co-operation with the valve seat 18. A suction pressure conduit 26 opens at one end to the second intake passage 11 through a port 27 at the upstream side of the second throttle valve 16 as shown in FIG. 2. The other end of the conduit 26 is connected with a pneumatic actuator 22. The pneumatic actuator 22 comprises a casing 22a in which a diaphragm 23 is disposed for dividing the inside of the casing 22a into a first chamber 24 and a second chamber 25. The first chamber 24 is connected with the conduit 26 leading from the second intake passages 11. The second chamber 25 is opened to atmosphere. The diaphragm 23 is connected with a push-pull rod 28 which has a switch contact 29a for co-operation with stationary contacts 29b of a switch 29. The pneumatic actuator 22 further includes a compression spring 30 which is disposed in the chamber 24 and urges the diaphragm 23 in a direction of holding the contact 29a in engagement with the contact 29b.

Referring further to FIG. 2, the ignition system includes an ignition coil 36 having a primary winding 36a and a secondary winding 36b. The primary winding 36a of the coil 36 is supplied with electricity from a power source 34 through a line 31 having a main ignition switch 35. The secondary winding 36b of the coil 36 is connected with an ignition plug 37. The ignition coil 36 is grounded on one hand through the switch 29 and a first breaker switch 32 and on the other hand through a second breaker switch 33. The first and second breaker switches 32 and 33 are associated with first and second breaker cams 32a and 33a so that they are opened cyclically by the cams. In the illustrated embodiment, the breaker switch 33 is opened at an advanced timing as compared with the breaker switch 32.

In operation, as long as the second throttle valve 16 in the second intake passage 11 remains closed, the port 27 is subjected to the atmospheric pressure, so that the switch 29 is maintained in the closed position under the action of the spring 30. Thus, the ignition timing is controlled by the breaker switch 32 and the engine is operated with a comparatively retarded ignition timing. As the throttle valve 16 is opened for heavy load operation, the port 27 is subjected to a suction pressure so that the pressure in the chamber 24 of the pneumatic actuator 22 is decreased to shift the diaphragm 23 upwards. Thus, the contact 29a is moved apart from the contact 29b to open the switch 29 so that the ignition timing is thereafter controlled by the breaker switch 33. Therefore, the engine is operated with an advanced ignition timing. It should be noted that the angular phase of the cams 32a and 33a may further be controlled in accordance with further engine operating conditions, such as engine speed.

Since the first intake passage 10 has a comparatively small cross-sectional area, the intake air can be passed through the passage 10 with a high speed under the light and medium load operations. Thus, atomization and vaporization of fuel can be enhanced. Further, it is possible to produce an intense swirl in the combustion chamber. Therefore, the timing of the breaker switch 32 is determined in such a manner that ignition takes place at a timing retarded as compared with the conventional engines. Under the heavy load operation, however, the flow speed is comparatively decreased so that the timing of the breaker switch 33 is determined as in the conventional engines.

It should be noted that the arrangement of FIG. 2 may be modified in such a manner that the port 27 in the second intake port 11 is so located that it is in the downstream side of the second throttle valve 16 when the throttle valve 16 is closed but is situated in the upstream side of the second throttle valve 16 when it is opened beyond a predetermined position. In such a case, the port 27 is connected with the chamber 25 of the pneumatic actuator 22 and the chamber 24 is opened to atmosphere. Further, the spring 30 may be located in the chamber 25.

Figure 3:
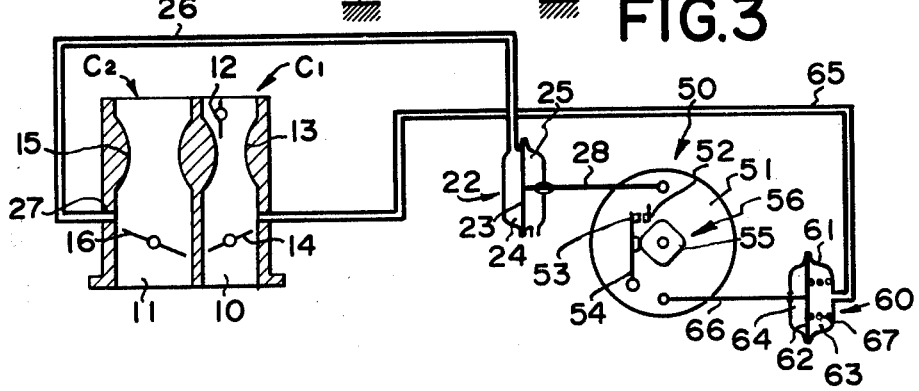
FIG. 3 is a view similar to FIG. 2 but showing another embodiment of the present invention.

Referring now to FIG. 3, there is shown another embodiment of the present invention which includes an ignition timing control device 50. The device 50 includes a disc 51 carrying a stationary contact 52 and a movable contact 53 which is provided at one end of a contact arm 54 mounted at the other end on the disc 51. A breaker cam 55 of a breaker assembly 56 engages the arm 54 so as to cyclically bring the movable contact 53 out of engagement with the stationary contact 52. A pneumatic actuator 22 similarly constructed as in the previous embodiment is connected at its rod 28 with the disc 51 of the ignition timing control device 50. The connection between the rod 28 and the disc 51 is such that, when the suction pressure in the chamber 24 increases, the disc 51 is rotated in counterclockwise direction wherein the ignition timing is advanced.

The device 50 shown in FIG. 3 is further associated with a suction type ignition timing advancer 60 which includes a casing 61 having a diaphragm 62 dividing the inside of the casing 61 into a suction pressure chamber 63 and an atmospheric pressure chamber 64. The chamber 63 is connected through a conduit 65 with the first intake passage 10. The diaphragm 62 has a push-pull rod 66 which is connected with the disc 51. In the chamber 63, there is disposed a compression spring 67 which urges the diaphragm 62 against the action of the suction pressure in the chamber 63. Such type of control of the ignition timing has been well known in the art and disclosed for example by the U.S. Pat. Nos. 3,353,524 and 3,561,410. Therefore, detailed descriptions of the control will not be made.

In operation, the first throttle valve 14 in the passage 10 is opened during light and medium load engine operations while the second throttle valve 16 is closed. The ignition timing is controlled by means of the pneumatic actuator 60 which is under the influence of the suction pressure in the first intake passage 10. The ignition takes place under this operation at a relatively retarded timing as compared with the timing conventional engines.

Under the heavy load operation, the throttle valve 16 in the second intake passage 11 is opened and the port 27 is subjected to a suction pressure. Thus, the diaphragm 23 is shifted toward left and causes a counterclockwise rotation of the disc 51 through the rod 28. The ignition timing is therefore advanced for the heavy load operation.

The invention has thus been shown and described with reference to specific embodiments, however, it should be noted that the invention is in no way limited to the details of the illustrated arrangements but changes and modifications may be made without departing from the scope of the appended claims.

We claim:

1. Internal combustion engine comprising:
   cylinder head means,
   cylinder means,
   piston means disposed in said cylinder means for defining combustion chamber means with said cylinder head means,
   carburetor means,
   intake manifold means provided between said carburetor means and said cylinder head means,
   intake port means provided in said cylinder head means opening to said combustion chamber means,
   first and second intake passage means provided in said carburetor means, said intake manifold means, and said cylinder head means and separated by wall means, said intake passage means being connected with said intake port means,
   said first intake passage means having a cross-sectional area which is small in relation to that of said second intake passage,
   first and second throttle valve means respectively provided in said first and second intake passage means of said carburetor means,
   means for actuating said first and second throttle valve means so that said first throttle valve means is opened under light load operation conditions and said second throttle valve means is closed, said second throttle valve means starting to open after the first throttle valve means has been substantially fully opened,
   means for controlling ignition timing,
   means for sensing that the second throttle valve means has been started to open and for controlling said ignition timing control means so that ignition timing is advanced under operation wherein the second throttle valve means is opened,
   said sensing means including pressure switch means which is adapted to be actuated under the pressure in said second intake passage.

2. Internal combustion engine in accordance with claim 1 in which said ignition timing control means includes first and second breaker means inserted in ignition circuit means of the engine,
   said second breaker means being adapted to be open earlier than said first breaker means to determine an advanced ignition timing,
   said sensing means bringing the first breaker means ineffective when the second throttle valve means is opened.

3. Internal combustion engine in accordance with claim 1 in which said pressure switch is of a normally closed type and adapted to be actuated under the pressure in the second intake passage at a position slightly upstream side of the second throttle valve in closed position.

4. Internal combustion engine in accordance with claim 1 in which said pressure switch means includes a suction pressure actuator means.

* * * * *